April 25, 1950 — E. A. ROCKWELL — 2,505,578
BALANCED CONTROL VALVE
Filed Feb. 17, 1943 — 2 Sheets-Sheet 2

INVENTOR
Edward A. Rockwell
BY
Arthur Wright
ATTORNEY

Patented Apr. 25, 1950

2,505,578

UNITED STATES PATENT OFFICE 2,505,578

BALANCED CONTROL VALVE

Edward A. Rockwell, Cleveland, Ohio

Application February 17, 1943, Serial No. 476,246

5 Claims. (Cl. 303—54)

My invention relates particularly to valves designed for obtaining a more accurate hydraulic control, and while my invention is capable of general applicability, it is especially applicable to the control of airplanes, for example airplane brakes.

This application is an improvement upon the subject matter of my Patent No. 2,244,966, granted June 10, 1941.

Hitherto, especially in the control of airplanes, in many installations a large volume of fluid was necessary to be supplied, as for example to the brakes, so that, accordingly, large areas were required on the valves used in the hydraulic control thereof. Consequently, the manual reaction forces were undesirably great and, furthermore, they varied considerably in the case of the different installations, according to the volume of liquid supplied or the valve areas for supplying the same. One of the objects of my invention is to avoid these disadvantages. An object of my invention is, furthermore, to obtain the desirable characteristics of the operation of such valves as set forth in my patent aforesaid without substantially subjecting the manual means to undesirably great or varying reaction pressures, according to the volume of liquid supplied and the valve areas required for supplying the same. Another object is to apply an increasing resistance to the manual actuation of the valve without substantially subjecting the same to variations in the line pressures. Again, a further object is to provide a manual actuating means therefor, the travel of which is, nevertheless, substantially co-ordinate to the line pressures produced thereby. In this way it is possible to substitute different valve sizes in the apparatus without substantially affecting the manual forces required in the operation thereof. A further object is to use a substantially balanced valve in connection therewith. This uniform and dependable operation of the hydraulic valve also makes it possible for the pilot of an airplane to sense, by the foot reaction, the degree of increasing viscosity of the hydraulic liquid under different atmospheric conditions, which is especially important in the operation of airplanes descending from the very high altitudes where the atmospheric temperatures are extremely low. Another object is to obtain further accuracy of operation by providing a valve which does not move with a movable valve seat. Furthermore, in the valve made in accordance with my invention, preferably there is a slight unbalancing of the forces so as to give at least some small reaction from the line pressures on the foot, although, if desired, the valve can be completely balanced. Nevertheless the manual operating mechanism made in accordance with my invention is not subjected substantially to the changes of pressure due to surges of the liquid. By, thus, substantially eliminating the effect of such pressures on the manual operating means the valve itself becomes more sensitive as it is not involved with the undesirable influences of the valve pressures upon the manual operating means.

While my invention is capable of embodiment in many different forms, for the purpose of illustration I have shown only one form thereof in the accompanying drawings, in which—

Figure 1:
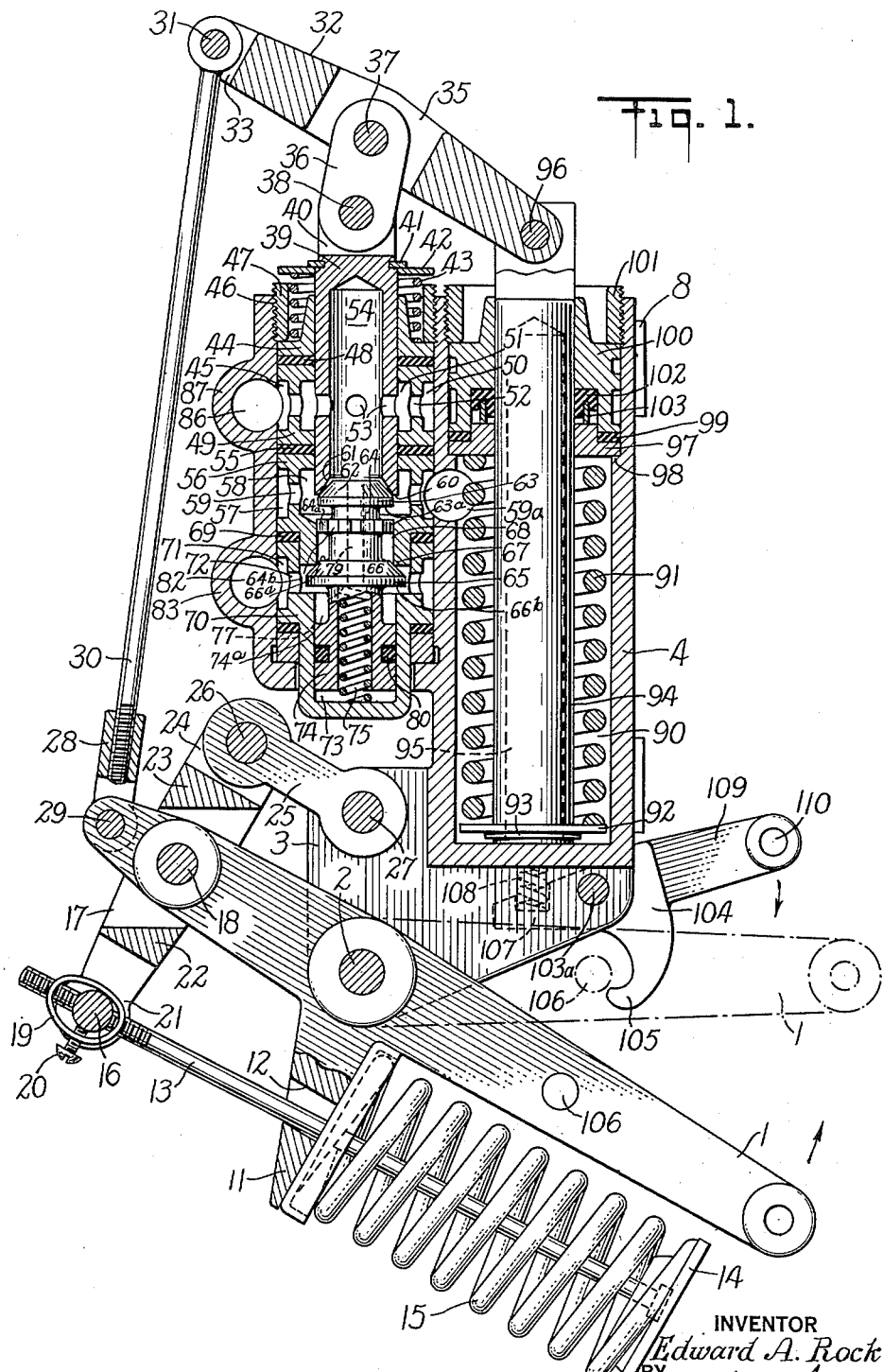
Fig. 1 is a vertical section through a valve mechanism made in accordance with my invention.
Figure 2:
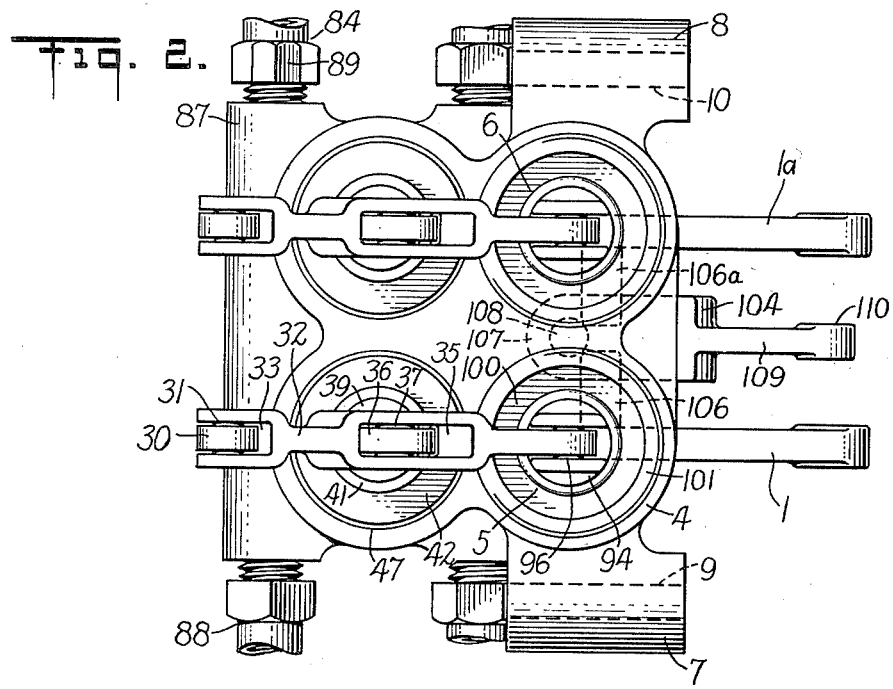
Fig. 2 is a plan view of the same.
Figures 3, 4:
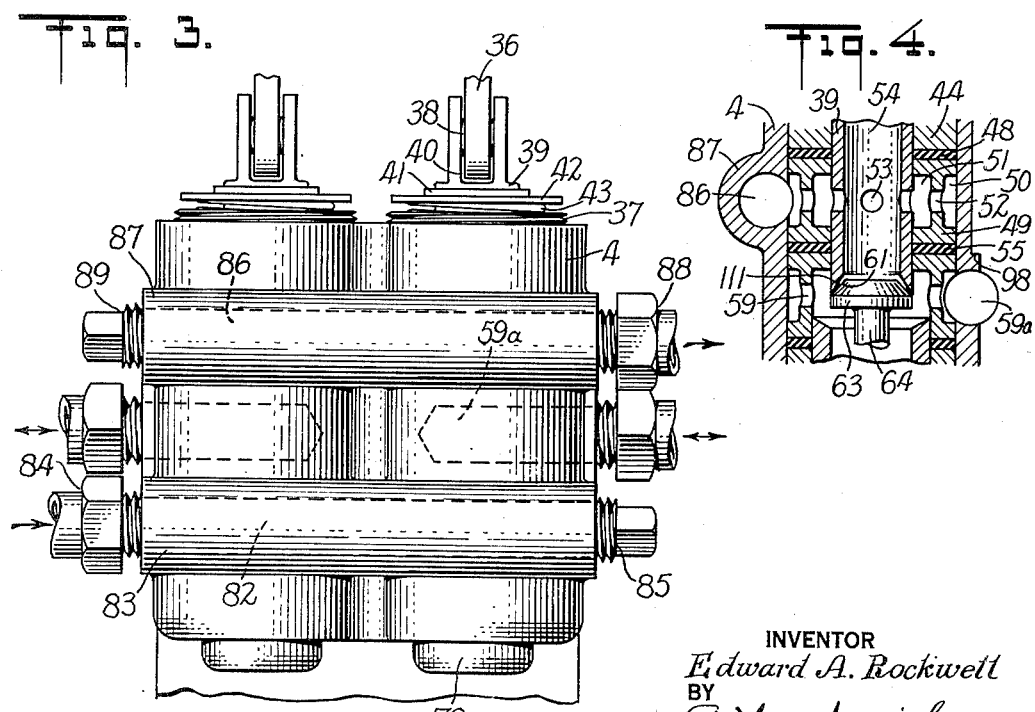
Fig. 3 is a side elevation of the same.
Fig. 4 is a vertical section of a modification showing an entirely balanced valve.

Referring to Figs. 1 to 3 in the drawings, I have shown a pair of operating levers 1 and 1a, each of which may be operated independently and manually by any desired manual operating means, such for instance as that shown in my patent aforesaid. However, the levers 1 and 1a are operated by upward movement while the operation of the corresponding lever in the said patent is by a downward movement so that, accordingly the operating parts for the levers 1 and 1a, as illustrated in the said patent, if used herein, would be inverted. As the levers 1 and 1a are constructed in the same manner, except as hereinafter noted, only one of them will be described in detail. The lever 1 is carried on a fixed pivot 2 on a bracket 3 forming a part of a valve casing 4. The valve casing 4 is preferably arranged to receive two valve mechanisms 5 and 6 constructed exactly alike and having the two separate manual operating levers 1 and 1a inasmuch as the valves are customarily built in pairs for the individual independent operation of the brakes respectively on each of the two main landing wheels of an airplane.

Accordingly, only one of these valves and its attached parts in the operating mechanism will be described in detail herein. The valve casing 4, furthermore, has thereon two bosses 7 and 8, having holes 9 and 10, respectively, for the attachment of the valve casing 4, at any desired point, on the airplane. The lever 1, furthermore, has an ear 11 provided with a hole 12 through which passes a rod 13 having a disc 14 at the lower end thereof for compressing a helical spring 15, while the other end of the spring rests against the ear 11. The said rod 13 is screw-threaded through a rotatable pin 16 which is pivotally carried in the end of a floating lever 17 supported on a pivot 18 on one end of the lever 1. An enclosing ring 19 is located on the rod 13 around the pivot pin 16 and is held in place by a screw 20. The lever 17 has at the lower portion thereof a bifurcated end 21, between the arms of which the ring 19 and the rod 13 are located. Transverse portions 22 and 23 are provided integral with the lever 17 to strengthen the same. The upper end of said lever 17 is also provided with a bifurcated end 24 in which there is carried a link 25 on a pivot 26, the lower end of said link being carried on a fixed pivot 27 located on the bracket 3. The link 25 and the lever 17 constitute a toggle joint.

The uppermost end of the lever 1 is connected to a screw-threaded socket member 28 by means of a pivot 29 and in said socket a link 30 is carried, the upper end of which is connected by a pivot 31 to a floating valve-operating lever 32, an upper bifurcated end 33 of which receives the upper end of the link 30. At substantially the middle portion of said lever 32 there is a slot 35 to receive a short link 36 which is carried on a pivot 37 in said lever 32. The lower end of the link 36 is connected by a pivot 38 to a valve plunger 39 provided with a bifurcated end 40 in which the lower end of the link 36 is carried. This valve plunger 39, near its upper end, has a split ring 41 carried in a recess on the plunger for supporting on the underside of said split ring a ring 42 against which the upper end of a spring 43 rests. The lower end of said spring 43 rests against a guide ring 44 located within a cylindrical chamber 45 in the valve casing 4. The upper end of this chamber 45 has a screw-thread 46 to receive a screw-ring 47 in order to retain the guide ring 44 in place. Beneath the guide ring 44 there is an annular rubber seal 48 and beneath the same, a spacing ring 49 having within the same an outer annular chamber 50 and an inner annular chamber 51 connected by ports 52. Opposite to the chamber 51 the plunger valve 39 has four ports 53 which communicate with a cylindrical chamber 54 in the interior of the plunger valve. Beneath the spacing ring 49 there is an annular rubber seal 55 and beneath the said rubber seal there is a valve seat ring 56 having an outer annular chamber 57 and an inner annular chamber 58 connected by a series of ports 59, the outer annular chamber 57 being in communication with a transverse passageway 59a leading to the usual wheel brake cylinder. The lower end of the plunger valve 39 is located in said inner annular chamber 58 and is provided at its lower end with a flat horizontal portion 60 as well as a tapered conical portion 61 on which a conical valve surface 62 seats. The flat portion 60 is provided in order to produce a slight unbalancing of the pressures exerted by the valve on the manual operating lever 1 when the valve 61, 62 is in closed position, so as to exert only a small reaction from the line pressure on the manual means. The valve surface 62 is carried by an upper valve head 63 provided with a lower balancing area 63a located on a valve stem 64 having a guide flange 64a with peripheral notches 64b connected to a lower valve head 65 having a conical valve surface 66 seating on a stationary valve seat 67 carried by the ring 56 also an upper balancing area 66a and a lower balancing area 66b. The valve stem 64 passes through a passageway 68 in the ring 56. Beneath the ring 56 there is an annular rubber seal 69 and beneath this seal there is an annular closure 70 having a peripheral chamber 71 therein provided with ports 72 leading to the valve 66, 67. This closure 70 has a cylindrical chamber 73, carrying an extension 74 of the valve head 65, in which there is a helical spring 75 resting against the bottom of the closure 70. On the top of the extension 74 there is a balancing area 74a balancing the area 66b as to the incoming liquid pressure. The upper portion of the extension 74 has an internal shoulder 77 for supporting the said spring 75. The extension and the valve head 63 have a longitudinal passageway 79 leading to the chamber 54 in order to equalize the discharge pressures on the top and bottom of the valve 66, 67 that may be exerted thereon at the bottom of the extension 74 and the top of the valve stem 64. Around the extension 74 there is an annular rubber seal 80.

In the valve casing 4 the chamber 71 communicates with a transverse passageway 82 in a boss 83 which extends transversely across the valve casing 4 to connect with the pair of inlet valves of the two valve mechanisms 5 and 6 located therein for operating the wheel brakes of the two wheels respectively. At one end of said passageway 82 there is an inlet pipe connection 84 which leads from or constitutes a suitable source of high pressure brake operating liquid, preferably supplied at a uniform pressure. The other end of the passageway 82 is closed by a screw plug 85, it being understood that the plug 85 in the pipe connection 84 may be transposed to the other end, if desired. Likewise, the outer chamber 45 communicates with a transverse passageway 86 in a boss 87 which extends entirely across the valve casing 4 to be connected to the pair of outlet valves of the valve mechanisms 5 and 6 for conducting away the discharge therefrom. One end of said passageway 86 has a discharge pipe connection 88 while the other end is closed by a screw plug 89, it being understood that the pipe connection 80 and the plug 89 may be transposed, if desired.

When the valve 66, 67 is opened manually the high pressure liquid which enters from the passageway 82 is conveyed past said valve through the port 59, not only to the wheel brake by the passageway 59a but also to the interior of a fluid pressure reaction device having a cylindrical chamber 90 carrying a helical spring 91, the lower end of which is supported upon an annular disc 92 held in place by a split ring 93 in a recess on a cylindrical plunger 94 having a central liquid receiving chamber 95 which communicates at its lower end with the interior of the chamber 90. The said plunger 94 has a pivotal connection 96 to the lower end of the lever 32. The upper end of the spring 91 rests against a guide ring 97 fitting against a shoulder 98 in the wall of the chamber 90, and above the said ring 97 there is an annular rubber seal 99 above which there is located a guide ring 100 held in place in the valve casing 4 by means of a screw ring 101 screwthreaded in the upper end of the chamber 90. Between the guide ring 97 and the ring 100 there is a U-shaped rubber seal 102 having a supporting ring 103 carried therein.

At the lower end of the valve casing 4 on the said bracket 3 there is, furthermore, carried on a pivot 103a, a manually operable catch 104 provided with a broad hook 105 thereon which is adapted to engage with a pin 106 on the manually operated lever 1 and a pin 106a on the lever 1a. The manually operable catch 104 has an arm 107 thereon in which there is located a spring 108, the upper end of which rests against the lower end of the valve casing 4 to normally move the catch 104 into released position in anti-clockwise direction. The said catch, however, has a manually operable arm 109 having a pivotal connection 110 for connection to any desired manual holding means for retaining the lever 109 in its downward position. By this means, in parking, when it is desired to lock the wheel brake the hook 105 will be engaged with the pin 106 so as to hold the brakes of the airplane wheels in the on position.

Fig. 4 shows a modification of the valve which in this instance eliminates the flat valve surface 60 and has, instead, a tapered conical valve surface 111 to make the valve completely balanced.

In the operation of the control valve made in accordance with my invention, when, for example, the same is to be operated for the application of the brakes on the wheels of an airplane, it will be understood that either one of the two levers 1 and 1a may be operated at will or both together for the control, respectively, of the two brakes on the landing wheels located side by side on the airplane. Accordingly, the operation of only one of said levers and its attached valve will be described in detail.

By the manual upward movement of the right hand end of the lever 1 the valve surface 61 will first become seated on the conical valve surface 62, thereby closing the outlet valve 61, 62 and a further downward movement of the plunger valve 39 will unseat the valve 66, 67, thereby admitting high pressure liquid from the port 72 to the passageway 68 and thence through the ports 59 to the interior of the cylindrical chamber 90 and through the port 59a to the wheel brake. The high pressure liquid is thus fed to the wheel brake cylinder in modulated amounts according to the movement of the manual lever 1 and increasing pressures can be built up in this way by admitting successive increments of the pressure liquid to the passageway 59a. At the same time that the pressure liquid is thus admitted to the wheel brake cylinder the liquid simultaneously has access to the chamber 90 and to the internal bore 95 of the plunger 94 so that the spring 91 will become correspondingly compressed in opposition to the pressure exerted on the wheel brake, which compression will increase as the pressure applied to the wheel brake is increased. However, as each increment of this pressure liquid is applied to the wheel brake there will be a corresponding movement of the plunger 94 upwardly by pressure with the increase of volume in the chamber 90 and coordinate to the movement of the manual lever 1 so as to move the valve plunger 39 slightly in an upward direction, thus seating the inlet valve 66, 67, but without unseating the outlet valve 61, 62. Therefore, there is a coordinate travel of the manual lever 1 with the increase of pressures applied to the wheel brake through the port 59a, owing to the increasing resistance of the spring 15, but when the manual lever is held at any particular position in which the pressure liquid is being applied, the pressure thus applied on the brake will continue without change. Simultaneously, with this action of applying the pressure liquid to the brake there will be exerted against the movement of the manual lever 1 an increasing resistance due to the spring 15, the resistance of which becomes progressively magnified as the lever 1 is moved, owing to the toggle action of the link 25 and lever 22.

However, it will be noted that this resistance to the movement of the lever 1 will be brought about by a degree of travel of the lever 1 which is coordinate to the increase of pressure applied to the wheel brake. Nevertheless the resistance to the movement of the lever 1 is substantially uninfluenced by the increasing liquid pressures applied to the wheel brake inasmuch as the valves 61, 62 and 66, 67 are substantially balanced, as in Figs. 1 to 3, or completely balanced, as shown in Fig. 4, and as the liquid pressure, tending to move the pivot 96 upwardly, is counterbalanced by the force of the spring 91 exerted downwardly. However, there is a slight differential reaction pressure exerted on the manual lever 1, as shown in Figs. 1 to 3, from the pressure liquid applied to the brake due to the small valve-unbalancing area 60, when the valve 61, 62 is in closed position. Accordingly, there will be a very slight reaction from the pressure liquid exerted through the valve on the manual lever 1, which increases as the liquid pressure on the wheel brake is increased, thus giving the operator a slight "feel" corresponding to the liquid pressure applied. Due to the operation of the control valve in this way it will be noted that the manual operation thereof will be carried out while being substantially unaffected by the varying liquid pressures exerted on the valve mechanism, notwithstanding the increasing pressures applied to the wheel brake in the course of the operation of the control valve.

In the operation of the valve, especially in regard to the inlet valve 66, the areas 74a and 66b balance each other as to the hydraulic pressure from the pipe 82, the surfaces 66a and 63a balance each other as to the delivered pressures and the area at the bottom of the extension 74 and the top of the valve stem 64 balance each other as to the discharge pressures.

This mode of operation is particularly important where large volumes of the pressure liquid are necessary to be applied, as for example in very heavy airplane constructions. Also, it will be seen, owing to this mode of operation, that different-diameter valves can be used, thus enabling larger or smaller diameter valves to be utilized with the same linkage without substantially influencing the resistance exerted to the movement of the manual lever 1. In other words, the resistance to the movement of said manual lever 1 will always be substantially entirely determined by the increasing resistance of the spring 15 which occurs at an increasing rate due to the toggle 25, 22. In this way a much more dependable and sensitive control of the hydraulic valve can be accomplished. This control, being accurate and sensitive, will furthermore enable the operator to determine by the "feel," by means of the area 60, any change in viscosity of the brake fluid, due to atmospheric temperatures, enabling a better manual control of the airplane brakes to be attained.

Also, while the manual means is substantially uninfluenced by the line pressures, it will be noted that, as set forth in my previous patent above referred to, the valve apparatus, nevertheless, prevents the lapse of a longer time interval in applying a lower level of pressures than when applying a higher level of pressures and permits substantially even low levels of pressure to be attained before substantially even high levels of pressure are reached. It will thus be seen that the foot, in applying the manual pressure through the lever 1 or 1a, can only travel at all times coordinately to the extent of pressures applied to the brakes through the port 59a, especially as the spring 15 always requires a manual effort in opposition thereto which increases according to the increase of hydraulic pressure in the outlet 59a, thus preventing any sudden forward movement of the manual means beyond the pressures being actually applied to the brakes. Furthermore, this prevents the disadvantageous feature, in the operation, of previous reduction valves in which a longer time element was required for producing lower levels of pressures than higher levels of pressures on the brakes. This is a very great disadvantage in the operation of airplanes, where the speed of landing is high and the time factor during landing is very short, so that if the longer time element were present for lower level pressures obtained there is a resultant serious lack of control of the airplane in landing. See my Patent No. 2,244,966, above referred to, page 3, column 1, lines 13 to 24, the curve diagram in Fig. 6 thereof, and claim 7 therein. In my construction, however, there is no longer time element required for obtaining the lower level of pressures but the lower level of pressures can be obtained just as quickly as the higher level of brake pressures, and, in fact, the lower brake pressure levels are attained in sequential order slightly before the higher brake pressures are attained. This enables an extremely effective and dependable control to be obtained in the operation of airplanes, etc., and which, as above stated, is of the utmost importance, especially as applied to the wheel brakes on airplanes.

When parking, where it is desired to lock the brakes in order to prevent the use of the airplane, the lever 109 will be yieldingly forced down and the manual lever 1 will be moved upwardly until the hook 105 engages with the pins 106 and 106a, thus retaining the hook in engagement with the pins 106 and 106a until it is released thereafter manually by the releasing movement of the lever 109.

While I have described my invention above in detail I wish it to be understood that many changes may be made therein without departing from the spirit of the same.

I claim:

1. A valve for use in a fluid pressure system comprising a valve body, inlet, working and return ports in the body, means communicating the ports with one another, a poppet valve in the body subjected to inlet port pressure, means in the body having an opening therein to slidably receive one end of the poppet valve to provide a guide therefor, said one end of the poppet valve constituted to be sealed from the inlet port pressure, means normally urging the poppet valve toward its seat to cut off communication between the inlet port and the other two ports, valve means in the body including a valve head carried by the other end of the poppet valve and a valve seat movable with respect to the valve head for controlling communication between the working and return ports and normally arranged to establish communication between the working and return ports, a longitudinal passage extending through the poppet valve and valve head, and means for operating the valve means and the poppet valve to urge the latter in a direction away from its seat to establish communication between the inlet and the working port and to urge the former in a direction to cut off communication between the working and return ports, said poppet valve seat, opening, and valve head, having equal diameters so constituted as to provide equal effective areas subject to inlet, return and working port pressures, whereby a hydraulically balanced poppet valve is obtained irrespective of the position of said poppet valve.

2. A valve for use in a fluid pressure system comprising a valve body having a bore therein, inlet, working and return ports in the body communicating with the bore, a poppet valve in one end of the bore subjected to inlet port pressure and normally spring urged toward its seat to cut off communication between the inlet port and the other two ports, means in one end of the bore having an opening therein to slidably receive one end of the poppet valve to provide a guide therefor, said one end of the poppet valve constituted to be sealed from the inlet port pressure, a valve head integral with the other end of said poppet valve, means for equalizing the pressures acting on the ends of the poppet valve, a member slidable in the other end of said bore and constructed and arranged to cooperate with the valve head to control communication between the working and return ports, said member being movable away from said valve head for establishing communication between the working and return ports, and means for moving said member to control communication between the working and return ports and for moving said poppet valve in a direction tending to unseat the same against the force of the spring, said poppet valve seat, opening, and valve head, having equal diameters so constituted as to provide equal effective areas subject to inlet, return and working port pressures whereby a hydraulically balanced poppet valve is obtained irrespective of the position of said poppet valve.

3. A valve for use in a fluid pressure system comprising a valve body having a bore therein, inlet, working and return ports in the body communicating with the bore, a poppet valve in one end of the bore subjected to inlet port pressure and normally spring urged toward its seat to cut off communication between the inlet port and the other two ports, means in one end of the bore having an opening therein to slidably receive one end of the poppet valve to provide a guide therefor, said one end of the poppet valve constituted to be sealed from the inlet port pressure, a valve head integral with the other end of said poppet valve, means for equalizing the pressures acting on the ends of the poppet valve, a member slidable in the other end of said bore and having intersecting longitudinal and radial bores therein which communicate the return port with the working port to provide communication therebetween, said member having a valve seat formed in the longitudinal bore for engagement with the valve head to control communication between the working and return ports, said member being movable in a direction tending to disengage the valve seat from the valve head, and means for moving said valve seat to engage the valve head and to unseat said poppet valve, said poppet valve seat, opening, and valve head, having equal diameters so constituted as to provide equal effective areas subject to inlet, return and working port pressures, whereby a hydraulically balanced poppet valve is obtained irrespective of the position of said poppet valve.

4. A valve for use in a fluid pressure system comprising a valve body having a bore therein, inlet, working and return ports in the body communicating with the bore, a poppet valve normally spring urged toward its seat to cut off communication between the inlet port and the other two ports, a closure member for one end of the bore constructed and arranged to slidably receive the poppet valve to provide a bearing therefor and at the same time seal one end of the poppet valve from the inlet port pressure, the diameters of the poppet valve seat and the bearing in the closure member being of the same dimension to thereby hydraulically balance the poppet valve against inlet port pressure when the valve is in cut-off position, a valve head integral with said poppet valve and located on the outside of the valve seat, a longitudinal passage extending through the poppet valve and valve head to thereby equalize the pressures acting on the ends of the poppet valve, a member slidable in the other end of said bore and having intersecting longitudinal and radial bores therein which communicate the return port with the working port to provide communication therebetween, said member having a valve seat formed in the longitudinal bore for engagement with the valve head to control communication between the working and return ports, said member being movable in a direction tending to disengage the valve seat from the valve head, and means for moving said valve seat to engage the valve head and to unseat said poppet valve.

5. A valve for use in a fluid pressure system comprising a valve body having a bore therein, inlet, working and return ports in the body communicating with the bore, a poppet valve normally spring urged toward its seat to cut off communication between the inlet port and the other two ports, a closure member for one end of the bore constructed and arranged to slidably receive the poppet valve to provide a bearing therefor and at the same time seal one end of the poppet valve from the inlet port pressure, the diameters of the poppet valve seat and the bearing in the closure member being of the same dimension to thereby hydraulically balance the poppet valve against inlet port pressure when the valve is in cut-off position, a valve head integral with said poppet valve and located on the outlet side of the valve seat, a longitudinal passage extending through the poppet valve and valve head to thereby equalize the pressures acting on the ends of the poppet valve, a member slidable in the other end of said bore and having intersecting longitudinal and radial bores therein which communicate the return port with the working port to provide communication therebetween, said member having a valve seat formed in the longitudinal bore for engagement with the valve head to control communication between the working and return ports, said member being normally spring urged in a direction tending to move the valve seat away from the valve head, and means for moving said valve seat to engage the valve head and to unseat said poppet valve, the diameter of the valve seat for the valve head and the diameter of the bearing in the closure member being of the same size so that the poppet valve will be hydraulically balanced against inlet and return port pressures when the poppet valve is unseated and the valve head is seated.

EDWARD A. ROCKWELL.

REFERENCES CITED

The following references are of record in the file of this patent:

UNITED STATES PATENTS

| Number | Name | Date |
|---|---|---|
| 1,588,660 | Christensen | June 15, 1926 |
| 2,243,781 | Thornhill | May 27, 1941 |
| 2,244,966 | Rockwell | June 10, 1941 |
| 2,267,663 | Moon | Dec. 23, 1941 |

FOREIGN PATENTS

| Number | Country | Date |
|---|---|---|
| 408,011 | Great Britain | Apr. 5, 1934 |